United States Patent
Saito et al.

(10) Patent No.: US 8,265,551 B2
(45) Date of Patent: Sep. 11, 2012

(54) RELAY STATION, MOBILE STATION, AND RELAY TRANSMISSION METHOD IN MOBILE COMMUNICATION SYSTEM

(75) Inventors: Yoshiko Saito, Kanagwa (JP); Takashi Aramaki, Osaka (JP); Kenichi Miyoshi, Kanagawa (JP); Katsuhiko Hiramatsu, Leuven (BE); Hidetoshi Suzuki, Kanagawa (JP); Jun Hirano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 427 days.

(21) Appl. No.: 12/669,148

(22) PCT Filed: Jul. 18, 2008

(86) PCT No.: PCT/JP2008/001935
§ 371 (c)(1), (2), (4) Date: Jan. 14, 2010

(87) PCT Pub. No.: WO2009/011135
PCT Pub. Date: Jan. 22, 2009

(65) Prior Publication Data
US 2010/0197223 A1    Aug. 5, 2010

(30) Foreign Application Priority Data

Jul. 19, 2007   (JP) ................. 2007-188572
Dec. 21, 2007   (JP) ................. 2007-330837

(51) Int. Cl.
    *H04Q 7/20*     (2006.01)
(52) U.S. Cl. .......... 455/23; 455/11.1; 455/7; 455/426.1; 455/552.1; 370/315; 370/319; 370/320; 370/321; 370/310
(58) Field of Classification Search ............. 455/23, 455/11.1, 7, 24, 15, 20, 426.1, 426.2, 550.1, 455/422.1, 403, 522, 69, 450, 500, 517, 509, 455/445, 551, 552.1; 370/315, 319, 320, 370/321, 310; 375/211, 213
See application file for complete search history.

(56) References Cited

U.S. PATENT DOCUMENTS 6,640,112 B1   10/2003   Lee
(Continued)

FOREIGN PATENT DOCUMENTS

JP    03-283724    12/1991
(Continued)

OTHER PUBLICATIONS

International Search Report dated Oct. 21, 2008.
(Continued)

*Primary Examiner* — Keith Ferguson
(74) *Attorney, Agent, or Firm* — Dickinson Wright PLLC

(57) ABSTRACT

Provided is a mobile communication system which includes a plurality of RAT (Radio Access Technology) and can eliminate the need of a control channel for reporting RAT information so as to prevent congestion or shortage of the control channel capacity. In the mobile communication system, an LTE relay station (30) has a cover area (31) identical to a cover area (21) owned by a WLAN host station (20) and relays/transmits the signal received from an LTE base station (10) to a mobile station (40) in the cover area (31). The LTE relay station (30) adds to the signal received from the LTE base station (10), one of the offsets: a frequency offset, a time offset, and a power offset as information indicating that the mobile station (40) which receives a relay signal from the local station is located in the cover area (21) of WLAN and transmits the signal after offset addition to the mobile station (40) located in the cover area (31) (i.e., the cover area (21)).

4 Claims, 13 Drawing Sheets

U.S. PATENT DOCUMENTS

| | | |
|---|---|---|
| 2004/0014474 A1 | 1/2004 | Kanada |
| 2005/0190821 A1 | 9/2005 | Fujii |
| 2005/0202823 A1 | 9/2005 | Shaheen |
| 2006/0145731 A1 | 7/2006 | Jiang |
| 2006/0281404 A1* | 12/2006 | Lee et al. .................. 455/11.1 |

FOREIGN PATENT DOCUMENTS

| | | |
|---|---|---|
| JP | 2001-168792 | 6/2001 |
| JP | 2003-348645 | 12/2003 |
| JP | 2004-023768 | 1/2004 |
| JP | 2005-101820 | 4/2005 |
| JP | 2005-229524 | 9/2005 |
| WO | 99/01005 | 1/1999 |
| WO | 2006/078627 | 7/2006 |

OTHER PUBLICATIONS

3GPP TSG RAN WG2 meeting #42, "Use of UTRAN for I-WLAN," Philips, R2-040997, May 2004, pp. 1-7.

3GPP TS 25.331 V5.19.0, "$3_{rd}$ Generation Partnership Project; Technical Specification Group Radio Access Network; Radio Resource Control (RRC); Protocol Specification (Release 5)," Technical Specification, Dec. 2006, pp. 1-1044, p. 2, line 22.

* cited by examiner

| RAT | Δf |
|---|---|
| WLAN | 30kHz |
| WiMAX | 60kHz |

FIG.3

| Δf | RAT |
|---|---|
| 29～31kHz | WLAN |
| 59～61kHz | WiMAX |

FIG.4

| RAT | ΔT |
|---|---|
| WLAN | 5 SAMPLES |
| WiMAX | 10 SAMPLES |

FIG.8

| ΔT | RAT |
|---|---|
| 3 TO 7 SAMPLES | WLAN |
| 8 TO 12 SAMPLES | WiMAX |

FIG.9

| RAT | ΔP |
|---|---|
| WLAN | −3dB |
| WiMAX | +5dB |

FIG.13

| ΔP | RAT |
|---|---|
| −5～−1dB | WLAN |
| +3～+7dB | WiMAX |

FIG.14

RELAY STATION, MOBILE STATION, AND RELAY TRANSMISSION METHOD IN MOBILE COMMUNICATION SYSTEM

TECHNICAL FIELD

The present invention relates to a relay station, mobile station and relay transmission method in mobile communication systems.

BACKGROUND ART

In recent years, with the multimediatization of information in mobile communication systems, transmitting high capacity data such as still images and movies in addition to speech data has become popular. To realize the transmission of high capacity data, a technology in which a high-frequency radio band is used to provide a high transmission rate is studied actively.

However, when a high-frequency radio band is used, although a high transmission rate can be expected in a short distance, attenuation due to transmission distance becomes greater as the distance increases. Accordingly, when the mobile communication system employing a high-frequency radio band is operated, the coverage area of a radio communication base station apparatus (hereinafter "base station") becomes small, which requires that a larger number of base stations be set up in order to prevent the service area from reducing. Since the set-up of base stations involves large costs, a technology is strongly demanded for realizing communication services which employ a high-frequency radio band and preventing an increase in the number of base stations.

To meet this demand, to expand the coverage area of the base stations, relay transmission technologies are investigated in which a radio communication relay station apparatus (hereinafter "relay station") is set up between a radio communication mobile station apparatus (hereinafter "mobile station") and a base station, and in which communication between the mobile station and the base station is carried out via the relay station.

Meanwhile, in future mobile communication systems, combining various radio access technologies (RATs) such as W-CDMA (Wideband Code Division Multiple Access), LTE (long-term evolution), WLAN (Wireless LAN), and WiMAX (Worldwide Interoperability for Microwave Access) and overlapping a plurality of RAT coverage areas in the service area of mobile communication will be taken into consideration. Then, in these mobile communication systems, a mobile station needs to detect in which RAT coverage area the mobile station is currently located and what communication service the mobile station is enjoyable. For example, when part of an LTE coverage area includes a WLAN coverage area, a mobile station located in the WLAN coverage area does not enjoy a WLAN communication service unless the mobile station detects that the mobile station is located in the WLAN coverage area, and the mobile station enjoys an LTE communication service only.

Then, conventionally, Non-Patent Document 1 discloses a technique of detecting in which RAT coverage area the mobile stations are located by reporting another RAT's information (e.g. WLAN) to the mobile stations from a RAT's base station (e.g. LTE) based on location information of the mobile stations.

Non-Patent Document 1: 3GPP TS 25.331 V5.19.0 (2006-12); Technical Specification, 3rd Generation Partnership Project; Technical Specification Group Radio Access Network; Radio Resource Control (RRC); Protocol Specification (Release 5)

DISCLOSURE OF INVENTION

Problems to be Solved by the Invention

However, with the above conventional technique, a control channel for reporting information about other RATs to the mobile stations is necessary. For example, when part of an LTE coverage area includes a WLAN coverage area, according to the above conventional technique, an LTE base station needs to report to mobile stations RAT information about WLAN (i.e. the information including RAT types and coverage area information about WLAN) using an LTE control channel. For this reason, according to the above conventional technique, a control channel of large capacity is necessary to report RAT information. The number of mixed RATs is expected to further increase in the future, and therefore there is a fear that the amount of RAT information and the frequency of reporting RAT information increase become tight or insufficient control channel capacity.

It is therefore an object of the present invention to provide a relay station, mobile station and relay transmission method that make a control channel for reporting RAT information unnecessary and prevent control channel capacity from becoming tight or insufficient in a mobile communication system in which a plurality of RATs mix.

Means for Solving the Problem

The relay station of the present invention adopts a configuration including: a receiving section that receives a signal from a base station employing a first radio access technique and covering a first coverage area; an addition section that adds one of a frequency offset, a time offset and a power offset to the signal; and a transmitting section that transmits to a mobile station the signal with the offset, in a third coverage area that is identical to a second coverage area, part or entirety of which includes the first coverage area, and which is covered by a host station employing a second radio access technique different from the first radio access technique.

The mobile station of the present invention adopts a configuration including: a receiving section that receives, in a first coverage area, a signal transmitted by a base station employing a first radio access technique and covering a first coverage area, and that receives a signal relayed by a relay station in a third coverage area that is identical to a second coverage area, part or entirety of which includes the first coverage area, and which is covered by a host station employing a second radio access technique different from the first radio access technique; and a detection section that detects whether or not the mobile station is located in the second coverage area, based on which one of a frequency offset, a time offset and a power offset is added to the received signal.

The relay transmission method of the present invention includes steps of: adding one of a frequency offset, a time offset and a power offset to a signal received from a base station, employing a first radio access technique and covering a first coverage area; and transmitting the signal with one offset to a mobile station in a third coverage area that is identical to a second coverage area, part or entirety of which includes the first coverage area, and which is covered by a host station employing a second radio access technique different from the first radio access technique.

Advantageous Effects of Invention

According to the present invention, in the mobile communication system in which a plurality of RATs mix, it is possible to make a control channel for reporting RAT information unnecessary and prevent control channel capacity from becoming tight or insufficient.

BRIEF DESCRIPTION OF DRAWINGS

FIG. 3 is a reference table that the relay station has, according to Embodiment 1 of the present invention;

FIG. 4 is a reference table that the mobile station has, according to Embodiment 1 of the present invention;

FIG. 8 is a reference table that the relay station has, according to Embodiment 2 of the present invention;

FIG. 9 is a reference table that the mobile station has, according to Embodiment 2 of the present invention;

FIG. 13 is a reference table that the relay station has, according to Embodiment 3 of the present invention;

FIG. 14 is a reference table that the mobile station has, according to Embodiment 3 of the present invention;

BEST MODE FOR CARRYING OUT THE INVENTION

Now, embodiments of the present invention will be described in detail with reference to the accompanying drawings.

Figure 1:
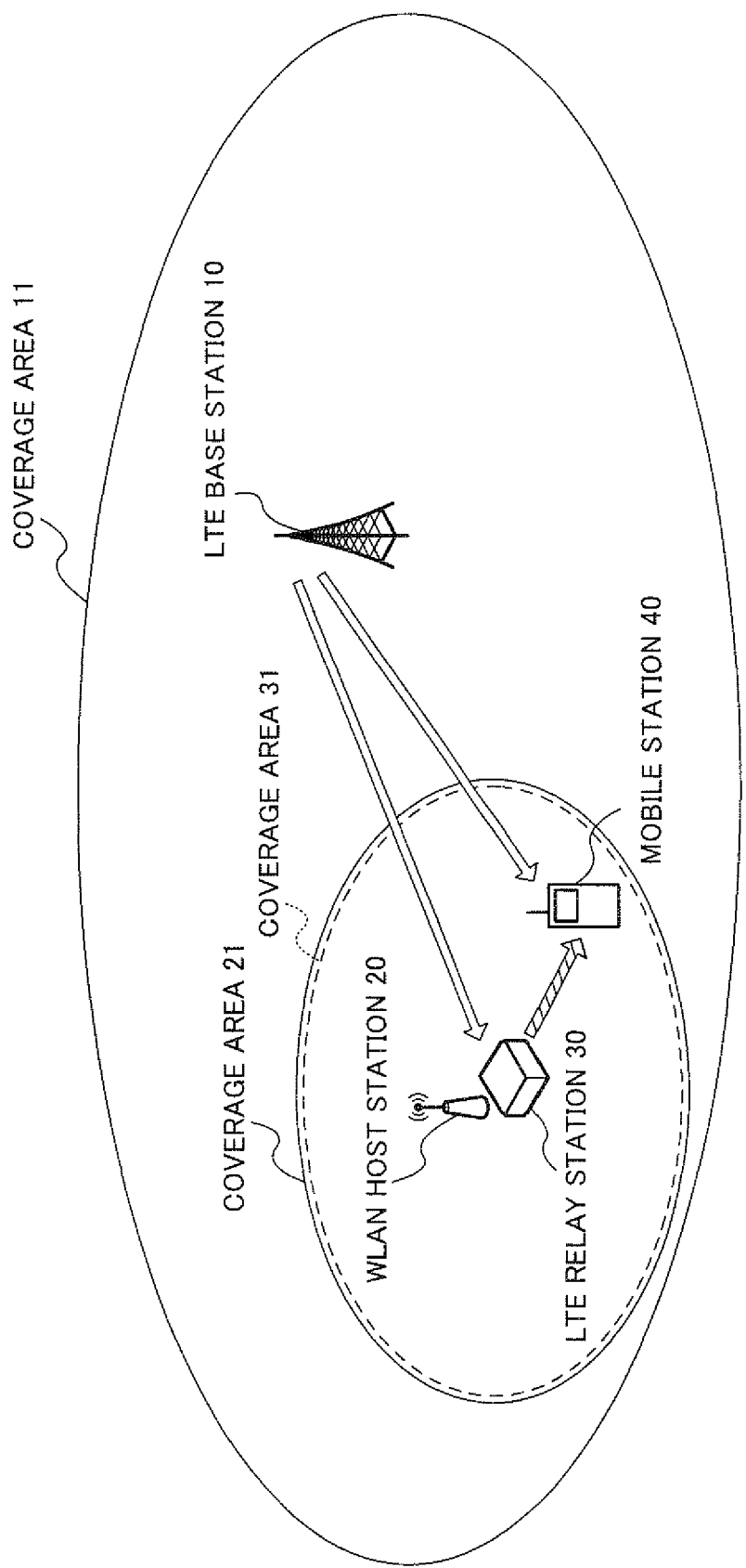
FIG. 1 illustrates a configuration of the mobile communication system according to embodiments of the present invention.

FIG. 1 shows a mobile communication system according to embodiments of the present invention. As shown in FIG. 1, with the mobile communication system according to the following embodiments, part of LTE coverage area 11 (i.e. coverage area of a wideband communication system) includes an entire WLAN coverage area 21 (i.e. coverage area of a narrowband communication system). That is, part of LTE coverage area 11 overlaps entire WLAN coverage area 21.

LTE base station 10, which covers coverage area 11, transmits a signal in this coverage area 11. This signal is received by LTE relay station 30 and mobile station 40. LTE relay station 30 covers identical coverage area 31 to coverage area 21, which WLAN host station 20 has, and relays, in coverage area 31, the signal received from LTE base station 10 to mobile station 40. That is, LTE relay station 30 relays a signal of LTE in WLAN coverage area 21 only. Therefore, mobile station 40 directly receives a signal transmitted by LTE base station 10 in coverage area 11, and receives a signal relayed by LTE relay station 30 in coverage area 31 (i.e. coverage area 21).

To make coverage area 31 and coverage area 21 identical, it is preferable to position LTE relay station 30 in an identical place to WLAN host station 20.

Further, LTE relay station 30 adds, to the relay signal, information to show that mobile station 40 receiving the relay signal from LTE relay station 30, is located in WLAN coverage area 21. To be more specific, LTE relay station 30 adds either a frequency offset, a time offset or a power offset, as the above information to the signal received from LTE base station 10, and transmits the signal with the offset to mobile station 40, located in coverage area 31 (that is, coverage area 21). This process of adding an offset is performed in a lower layer than layer 1.

That is, mobile station 40 can decide whether or not the mobile station 40 is located in WLAN coverage area 21 based on which one of the above offsets is added to a received signal. Consequently, mobile station 40 can enjoy a WLAN communication service when mobile station 40 is located in coverage area 21 within coverage area 11.

Embodiment 1

With the present embodiment, a case will be described where a frequency offset is added to a signal subject to relay.

Figure 2:
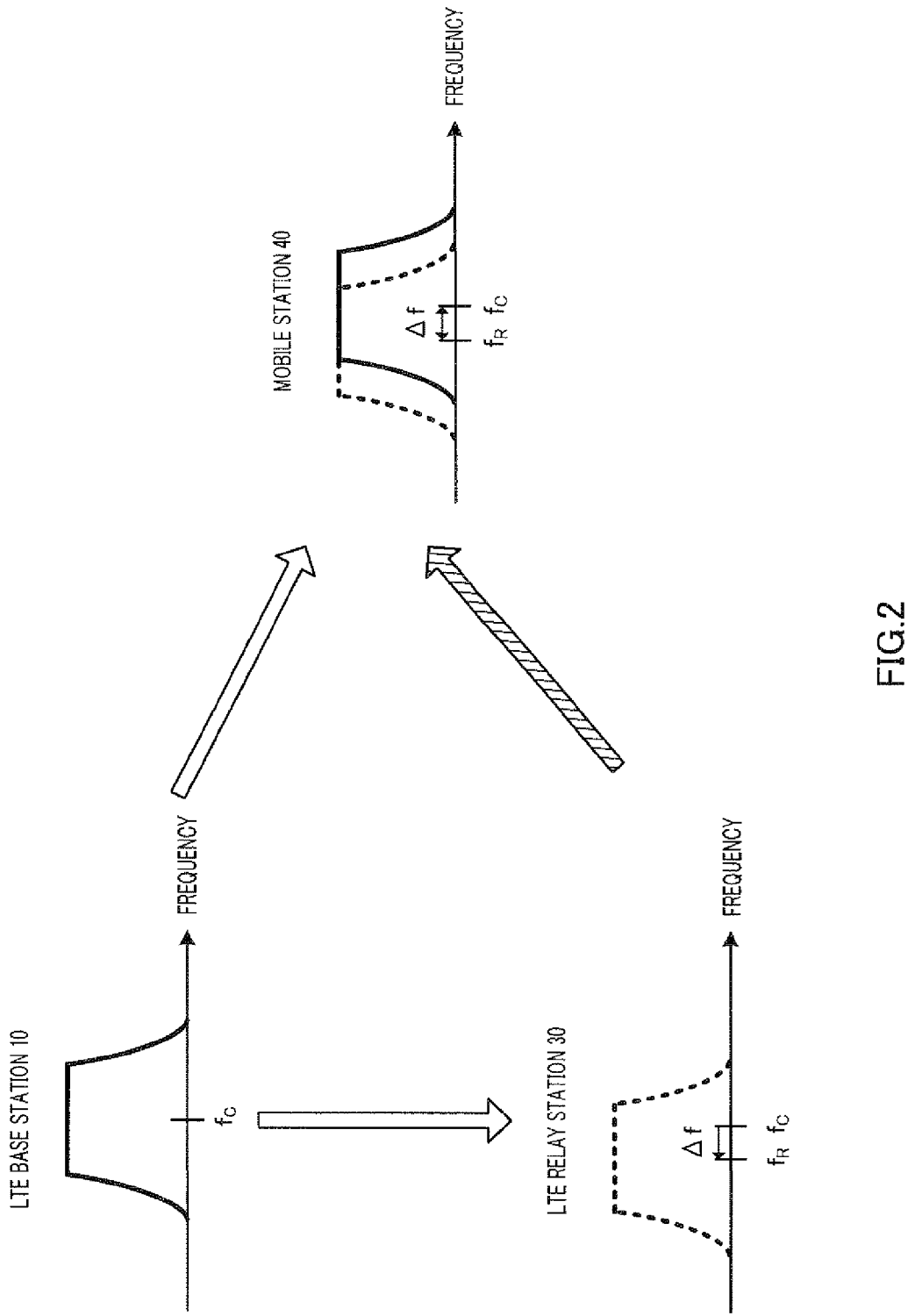
FIG. 2 is an example of transmitting and receiving a signal according to Embodiment 1 of the present invention.

With the present embodiment, as shown in FIG. 2, LTE base station 10 transmits a signal having a center frequency $f_C$.

When LTE relay station 30 receives the signal from LTE base station 10 and relays the signal to mobile station 40, LTE relay station 30 adds frequency offset $\Delta f$ to the signal from LTE base station 10, to shift the center frequency to $f_R$. The magnitude of $\Delta f$ varies between RATs covering an identical coverage area to coverage area 31 of LTE relay station 30. For example, if coverage area 31 of LTE relay station 30 is identical to WLAN coverage area 21 as shown in FIG. 1, $\Delta f$ is 30 kHz as shown in FIG. 3. Further, for example, if coverage area 31 of LTE relay station 30 is identical to a WiMAX coverage area, $\Delta f$ is 60 kHz as shown in FIG. 3. Then, LTE relay station 30 relays the signal having center frequency $f_R$ to mobile station 40.

Mobile station 40 decides in which RAT coverage area mobile station 40 is located based on whether or not frequency offset $\Delta f$ is added to the received signal.

Mobile station 40, located in the overlapping part of LTE coverage area 11 and another RAT coverage area, receives both the signal having center frequency $f_C$ and transmitted by LTE base station 10 and the signal having center frequency $f_R$ and relayed by LTE relay station 30. Accordingly, mobile station 40, located in overlapping part of LTE coverage area 11 and another RAT coverage area, can detect frequency offset $\Delta f = |f_R - f_C|$ added by LTE relay station 30. For example, as shown in FIG. 4, when $\Delta f$ having a range of 29 to 31 kHz is added to a received signal, mobile station 40 detects that mobile station 40 is located in WLAN coverage area 21 and can enjoy both WLAN and LTE communication services. Further, for example, as shown in FIG. 4, when $\Delta f$ having a range of 59 to 61 kHz is added to a received signal, mobile station 40 detects that mobile station 40 is located in the WiMAX coverage area and can enjoy both WiMAX and LTE communication services.

On the other hand, mobile station 40, located outside the above overlapping part in LTE coverage area 11, receives only the signal having center frequency $f_C$ and transmitted by LTE base station 10. Accordingly, mobile station 40, located outside the above overlapping part in LTE coverage area 11, cannot detect frequency offset $\Delta f$ having the ranges shown in FIG. 4. For example, when $\Delta f$ having the ranges shown in FIG. 4 is not added to a received signal, mobile station 40 detects that mobile station 40 is not located in WLAN coverage area 21 or in the WiMAX coverage area and can enjoy LTE communication service only. That is, when frequency offset $\Delta f$ is not added to a received signal, mobile station 40 can decide that mobile station 40 is located outside the coverage area of a narrowband communication system.

Next, an optimal value of frequency offset $\Delta f$ will be explained.

In LTE, when the maximum downlink carrier frequency is 2690 MHz and the maximum moving speed of a mobile station is 350 km/h, the maximum frequency error due to crystal error in the mobile station upon detecting a coverage area (i.e. upon acquiring initial synchronization) is estimated, for example, ±5 ppm. This maximum frequency error refers to an error in the initial status of the crystal provided in the mobile station, that is, an error before performing synchronization acquisition. Accordingly, the maximum Doppler shift due to fading is 872 Hz and the maximum frequency error due to crystal error is 13450 Hz. Accordingly, the maximum frequency error $f_{error\_max}$=(the maximum Doppler shift due to fading+the maximum frequency error due to crystal error)= 14322 Hz≈14 kHz. Therefore, the value of frequency offset $\Delta f$ added by LTE relay station 30 needs to be within the range of $f_{detect}$ that can be detected in mobile station 40 and separatable from the maximum frequency error $f_{error\_max}$≈14 kHz. That is, to make detection easier, it is preferable that the value of $\Delta f$ meets both condition (1) $\Delta f \leq f_{detect} - f_{error\_max}$ and condition (2) $\Delta f > 2*f_{error\_max}$. Then, with the present embodiment, as shown in FIG. 3, $\Delta f$ in WLAN is 30 kHz and $\Delta f$ in WiMAX is 60 kHz.

Figure 5:
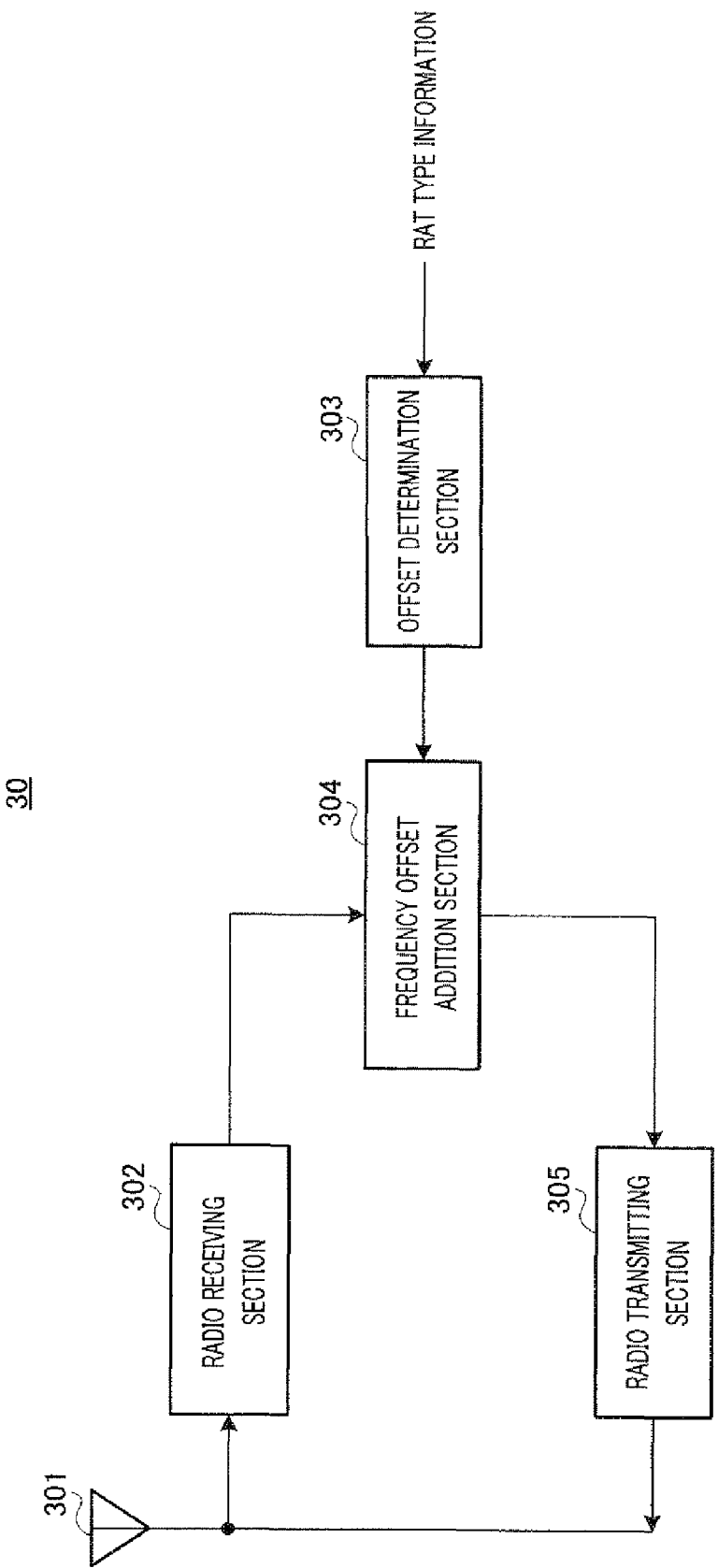
FIG. 5 is a block diagram showing the configuration of the relay station according to Embodiment 1 of the present invention.

Next, the configuration of LTE relay station 30 according to the present embodiment will be described. FIG. 5 shows the configuration of LTE relay station 30 according to the present embodiment.

In LTE relay station 30 shown in FIG. 5, radio receiving section 302 receives a signal transmitted from LTE base station 10 via antenna 301, and performs receiving processing including down-conversion and A/D conversion on the received signal, to output the resulting signal to frequency offset addition section 304.

Offset determination section 303, which has the table shown in FIG. 3, determines frequency offset $\Delta f$ with reference to the table shown in FIG. 3 according to RAT type information received as input. If the RAT type is WLAN, $\Delta f$ is determined to be 30 kHz. Further, if the RAT type is WiMAX, $\Delta f$ is determined to be 60 kHz. If LTE relay station 30 is connected to a host station of a narrowband communication system that covers an identical coverage area to LTE relay station 30 (e.g. WLAN host station 20 in FIG. 1) via a wired connection, LTE relay station 30 acquires RAT type information from the host station. $\Delta f$ determined in offset determination section 303 is inputted to frequency offset addition section 304.

Frequency offset addition section 304 adds $\Delta f$ determined in offset determination section 303 to the signal received as input from radio receiving section 302, and outputs the signal with the frequency offset to radio transmitting section 305.

Radio transmitting section 305 performs transmitting processing including D/A conversion and up-conversion on the signal with the frequency offset, and relays the resulting signal from antenna 301 to mobile station 40.

Figure 6:
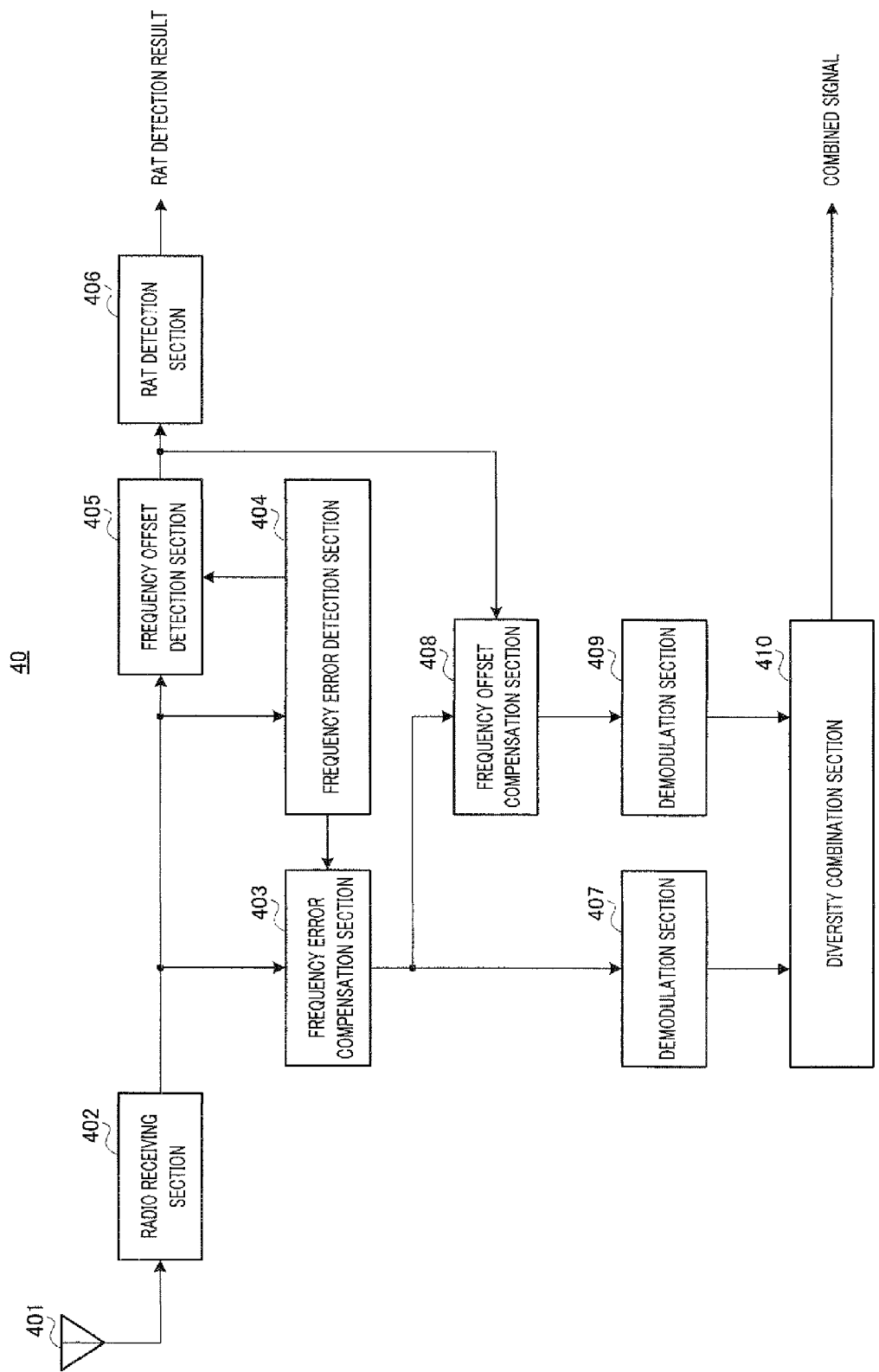
FIG. 6 is a block diagram showing the configuration of the mobile station according to Embodiment 1 of the present invention.

Next, the configuration of mobile station 40 according to the present embodiment will be described. FIG. 6 shows the configuration of mobile station 40 according to the present embodiment.

In mobile station 40 shown in FIG. 6, radio receiving section 402 receives only a signal from LTE base station 10, or a signal from LTE base station 10 and a signal from LTE relay station 30 via antenna 401, and performs receiving processing including down-conversion and A/D conversion on each received signal, to output the resulting signal to frequency error compensation section 403, frequency error detection section 404 and frequency offset detection section 405.

Frequency error detection section 404 detects a frequency error $f_{error}$ of the received signal=(Doppler shift due to fading+the frequency error due to crystal error) and outputs the detected frequency error to frequency error compensation section 403 and frequency offset detection section 405.

Frequency error compensation section 403 compensates for the frequency error $f_{error}$ of the received signal and outputs the signal after the frequency error compensation to demodulation section 407 and frequency offset compensation section 408.

Demodulation section 407 demodulates the signal after frequency error compensation and outputs the demodulated signal to diversity combination section 410.

Frequency offset detection section 405 detects frequency offset $\Delta f = |f_R - f_C|$ with the received signal. The detected $\Delta f$ is inputted to RAT detection section 406 and frequency offset compensation section 408.

Frequency offset compensation section 408 further compensates for the frequency offset $\Delta f$ with the signal after frequency error compensation and outputs the signal after frequency offset compensation, to demodulation section 409.

Demodulation section 409 demodulates the signal after the frequency error compensation and the frequency offset compensation, and outputs the demodulated signal to diversity combination section 410.

Diversity combination section 410 diversity-combines the signal received as input from demodulation section 407 and the signal received as input from demodulation section 409 and outputs a combined signal.

RAT detection section 406, which has the table shown in FIG. 4 detects in which RAT coverage area mobile station 40 is located as described above, with reference to the table shown in FIG. 4 according to $\Delta f$ detected by frequency offset detection section 405. Then. RAT detection section 406 outputs a RAT detection result.

Embodiment 2

With the present embodiment, a case will be described where a time offset is added to a signal subject to relay.

Figure 7:
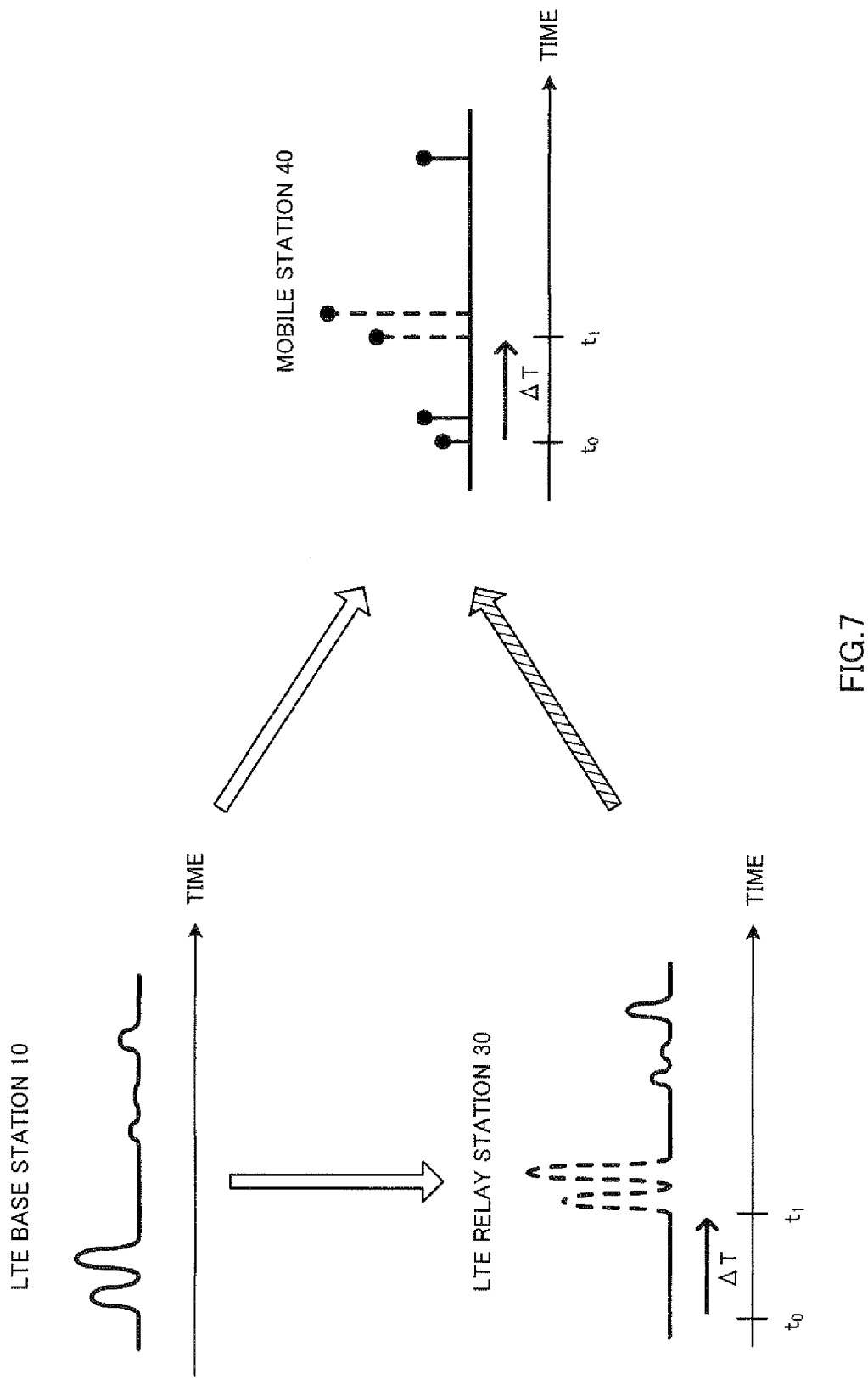
FIG. 7 is an example of transmitting and receiving a signal according to Embodiment 2 of the present invention.

With the present embodiment, as shown in FIG. 7, LTE relay station 30 receives a signal having a peak at time $t_0$ from LTE base station 10.

When LTE relay station 30 receives the signal from LTE base station 10 and relays the signal to mobile station 40, LTE relay station 30 adds time offset $\Delta T$ to the signal from LTE base station 10, to generate a signal having a peak at time $t_1$. The magnitude of $\Delta T$ varies between RATs covering an identical coverage area to coverage area 31 of LTE relay station 30. For example, if coverage area 31 of LTE relay station 30 is identical to WLAN coverage area 21 as shown in FIG. 1, ΔT is 5 samples as shown in FIG. 8. Further, for example, if coverage area 31 of LTE relay station 30 is identical to a WiMAX coverage area, ΔT is 10 samples as shown in FIG. 8. Then, LTE relay station 30 relays the signal having the time offset ΔT and the peak at time $t_1$, to mobile station 40.

Mobile station 40 decides in which RAT coverage area mobile station 40 is located based on whether or not time offset ΔT is added to the received signal.

Mobile station 40, which is located in overlapping part of LTE coverage area 11 and another RAT coverage area, receives both the signal having a peak at time $t_0$ and transmitted by LTE base station 10 and the signal having a peak at time $t_1$ and relayed by LTE relay station 30. Accordingly, mobile station 40, which is located in overlapping part of LTE coverage area 11 and another RAT coverage area, can detect time offset ΔT=|$t_1$−$t_0$| added by LTE relay station 30. For example, as shown in FIG. 9, when ΔT having a range of 3 to 7 samples is added to a received signal, mobile station 40 detects that mobile station 40 is located in WLAN coverage area 21 and can enjoy both WLAN and LTE communication services. Further, for example, as shown in FIG. 9, when ΔT having a range of 8 to 12 samples is added to a received signal, mobile station 40 detects that mobile station 40 is located in the WiMAX coverage area and can enjoy both WiMAX and LTE communication services.

On the other hand, mobile station 40, located outside the above overlapping part in LTE coverage area 11, receives only the signal having a peak at time $t_0$ and transmitted by LTE base station 10. Accordingly, mobile station 40, located outside the above overlapping part in LTE coverage area 11, cannot detect time offset ΔT having the ranges shown in FIG. 9. For example, when ΔT having the ranges shown in FIG. 9 is not added to a received signal, mobile station 40 detects that mobile station 40 is not located in WLAN coverage area 21 or in the WiMAX coverage area and can enjoy LTE communication service only. That is, when time offset ΔT is not added to a received signal, mobile station 40 can decide that mobile station 40 is located outside the coverage area of a narrowband communication system.

In LTE, usually, a guard interval $T_{guard}$ is set based on several tens to hundreds of samples, taking into consideration of the maximum delay time of a multipath $T_{delay\_max}$. That is, to make detection easier, it is preferable that the value of time offset ΔT added by LTE relay station 30, meets the condition ΔT≧$T_{guard}$−$T_{delay\_max}$.

Figure 10:
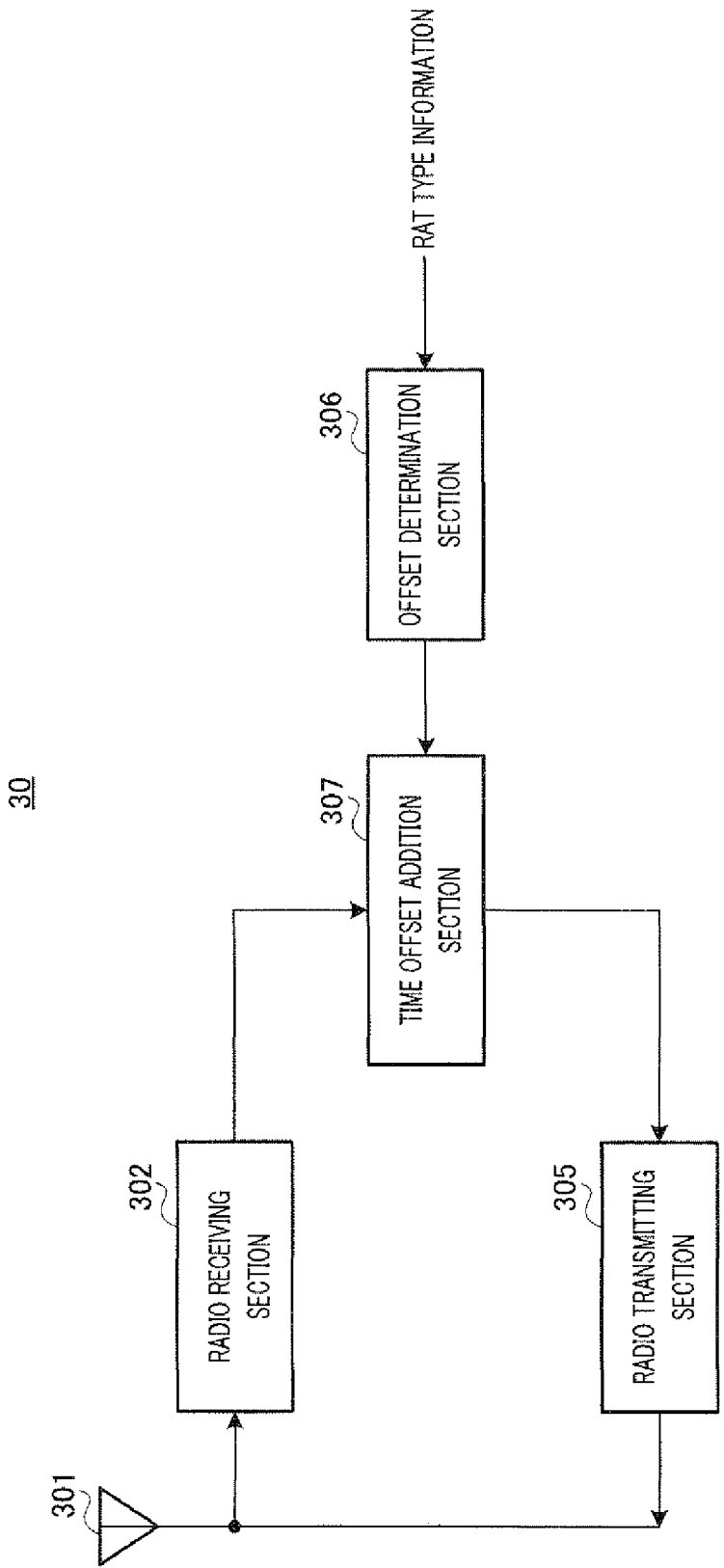
FIG. 10 is a block diagram showing the configuration of the relay station according to Embodiment 2 of the present invention.

Next, the configuration of LTE relay station 30 according to the present embodiment will be described. FIG. 10 shows the configuration of LTE relay station 30 according to the present embodiment. Further, in FIG. 10 the same reference numerals are assigned to the same parts in FIG. 5 (Embodiment 1), and description thereof will be omitted.

In LTE relay station 30 shown in FIG. 10, offset determination section 306, which has the table shown in FIG. 8 determines time offset ΔT with reference to the table shown in FIG. 8 according to RAT type information received as input. If the RAT type is WLAN, ΔT is determined to be 5 samples. Further, if the RAT type is WiMAX, ΔT is determined to be 10 samples. If LTE relay station 30 is connected to a host station of a narrowband communication system that covers an identical coverage area to LTE relay station 30 (e.g. WLAN host station 20 in FIG. 1) via a wired connection, LTE relay station 30 acquires RAT type information from the host station. ΔT determined in offset determination section 306 is inputted to time offset addition section 307.

Time offset addition section 307 adds ΔT determined in offset determination section 306 to the signal received as input from radio receiving section 302, and outputs the signal with the time offset to radio transmitting section 305.

Figure 11:
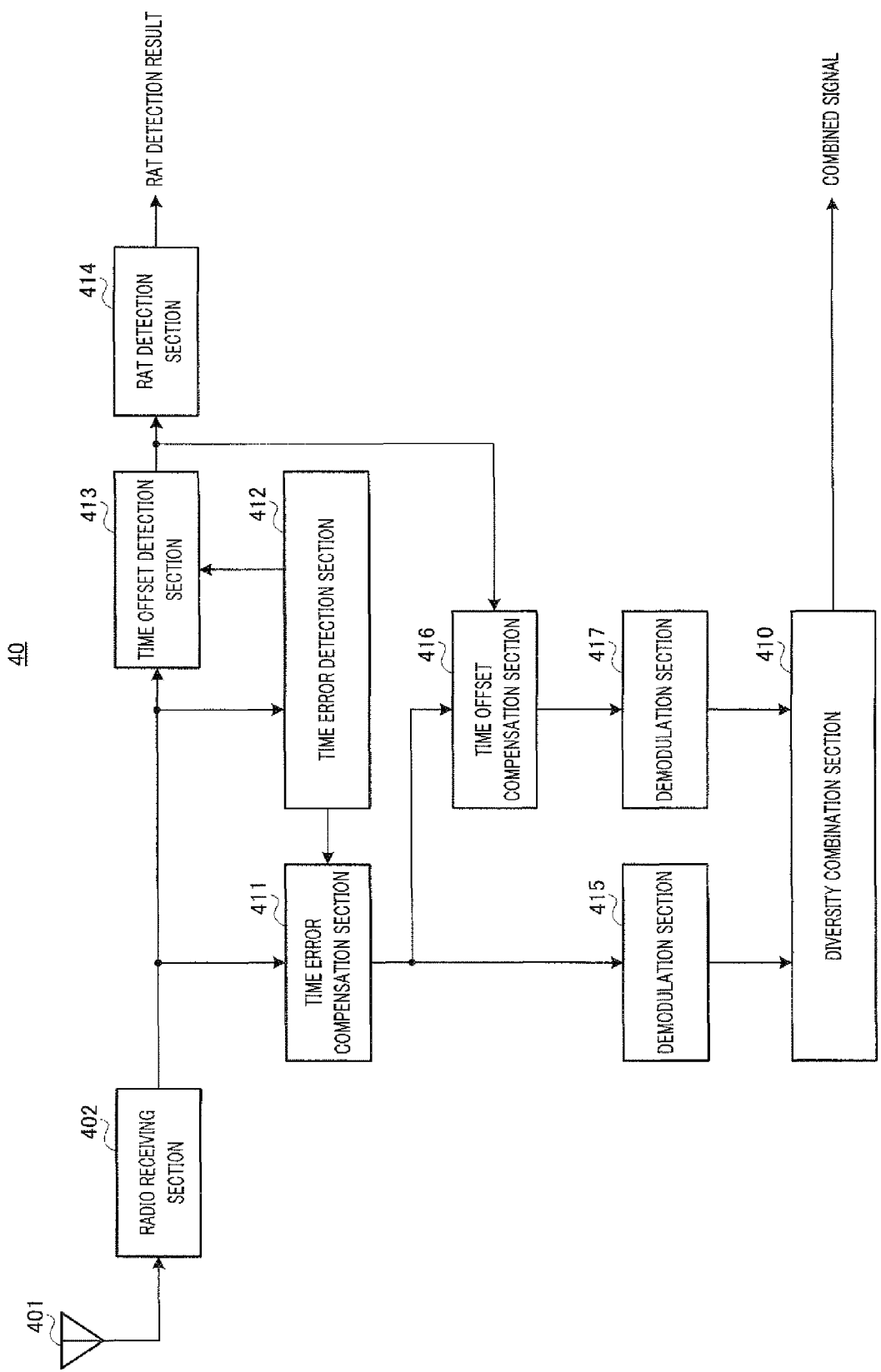
FIG. 11 is a block diagram showing the configuration of the mobile station according to Embodiment 2 of the present invention.

Next, the configuration of mobile station 40 according to the present embodiment will be described. FIG. 11 shows the configuration of mobile station 40 according to the present embodiment. Further, in FIG. 11 the same reference numerals are assigned to the same parts in FIG. 6 (Embodiment 1), and description thereof will be omitted.

In mobile station 40 shown in FIG. 11, radio receiving section 402 receives only a signal from LTE base station 10, or a signal from LTE base station 10 and a signal from LTE relay station 30 via antenna 401, and performs receiving processing including down-conversion and A/D conversion on each received signal, to output the resulting signal to time error compensation section 411, time error detection section 412 and time offset detection section 413.

Time error detection section 412 detects time error of the received signal by the channel and outputs the detected time error to time error compensation section 411 and time offset detection section 413.

Time error compensation section 411 compensates for the time error of the received signal by the channel and outputs the signal after the time error compensation, to demodulation section 415 and time offset compensation section 416.

Demodulation section 415 demodulates the signal after time error compensation and outputs the demodulated signal to diversity combination section 410.

Time offset detection section 413 detects time offset ΔT=|$t_1$−$t_0$| with the received signal. The detected ΔT is inputted to RAT detection section 414 and time offset compensation section 416.

Time offset compensation section 416 further compensates for the time offset ΔT with the signal after time error compensation and outputs the signal after time offset compensation, to demodulation section 417.

Demodulation section 417 demodulates the signal after time error compensation and time offset compensation and outputs the demodulated signal to diversity combination section 410.

Diversity combination section 410 diversity-combines the signal received as input from demodulation section 415 and the signal received as input from demodulation section 417 and outputs a combined signal.

RAT detection section 414, which has the table shown in FIG. 9 detects in which RAT coverage area mobile station 40 is located, as described above, with reference to the table shown in FIG. 9 according to ΔT detected by time offset detection section 413. Then, RAT detection section 414 outputs a RAT detection result.

Embodiment 3

With the present embodiment, cases will be described where a power offset is added to a signal subject to relay.

Figure 12:
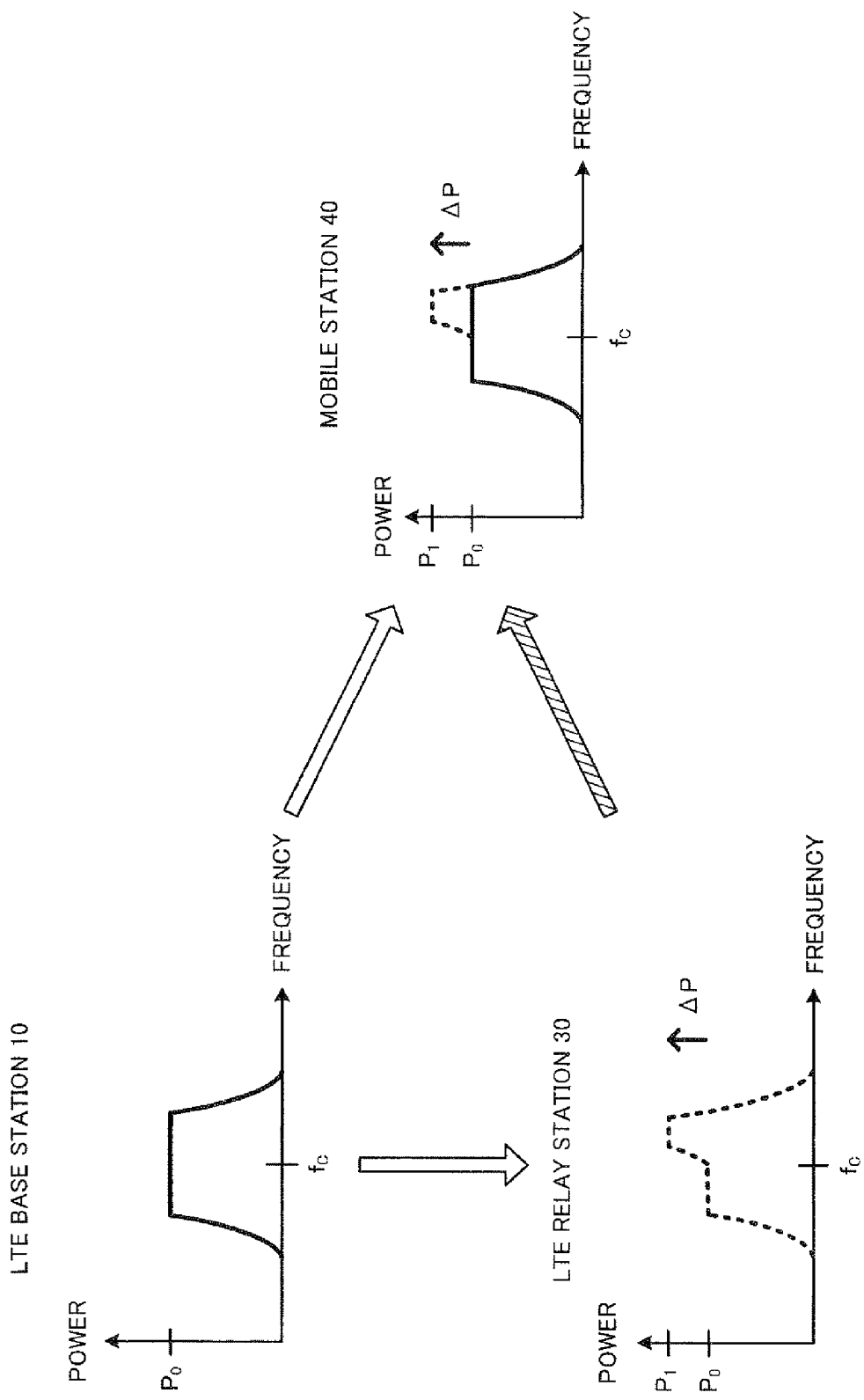
FIG. 12 is an example of transmitting and receiving a signal according to Embodiment 3 of the present invention.

With the present embodiment, as shown in FIG. 12, LTE base station 10 transmits a signal having power $P_0$.

When LTE relay station 30 receives a signal from LTE base station 10 and relays the signal to mobile station 40, LTE relay station 30 adds power offset ΔP to part of the signal from LTE base station 10, to generate a signal having power $P_0$ and $P_1$. The magnitude of ΔP varies between RATs covering an identical coverage area to coverage area 31 of LTE relay station 30. For example, if coverage area 31 of LTE relay station 30 is identical to WLAN coverage area 21 as shown in FIG. 1, ΔP is −3 dB as shown in FIG. 13. Further, for example, if coverage area 31 of LTE relay station 30 is identical to a WiMAX coverage area, ΔP is +5 dB as shown in FIG. 13. Then, LTE relay station 30 relays the signal with power offset ΔP to mobile station 40.

Mobile station 40 detects in which RAT coverage area mobile station 40 is located based on whether or not power offset ΔP is added to the received signal.

Mobile station 40, located in the overlapping part of LTE coverage area 11 and another RAT coverage area, receives both the signal having power $P_0$ and transmitted by LTE base station 10 and the signal having power $P_0$ and $P_1$ and relayed by LTE relay station 30. Accordingly, mobile station 40, located in overlapping part of LTE coverage area 11 and another RAT coverage area, can detect power offset $\Delta P=|P_1-P_0|$ added by LTE relay station 30. For example, as shown in FIG. 14, when ΔP having a range of −5 to −1 dB is added to a received signal, mobile station 40 detects that mobile station 40 is located in WLAN coverage area 21 and can enjoy both WLAN and LTE communication services. Further, for example, as shown in FIG. 14, when ΔP having a range of +3 to +7 dB is added to a received signal, mobile station 40 detects that mobile station 40 is located in the WiMAX coverage area and can enjoy both WiMAX and LTE communication services.

On the other hand, mobile station 40, located outside the above overlapping part in LTE coverage area 11, receives only the signal having power $P_0$ and transmitted by LTE base station 10. Accordingly, mobile station 40, located outside the above overlapping part in LTE coverage area 11, cannot detect power offset ΔP having the ranges shown in FIG. 14. For example, when ΔP having the ranges shown in FIG. 14 is not added to a received signal, mobile station 40 detects that mobile station 40 is not located in WLAN coverage area 21 or in the WiMAX coverage area and can enjoy LTE communication service only. That is, when power offset ΔP is not added to a received signal, mobile station. 40 can decide that mobile station 40 is located outside the coverage area of a narrowband communication system.

In LTE, received dynamic range $P_{total}$ is usually set by adding a margin to dynamic range $P_{fading}$ estimated using fading fluctuations. That is, to make detection easier, it is preferable that the value of power offset ΔP is added by LTE relay station 30, meets the condition $\Delta P \leq P_{total}-P_{fading}$.

Figure 15:
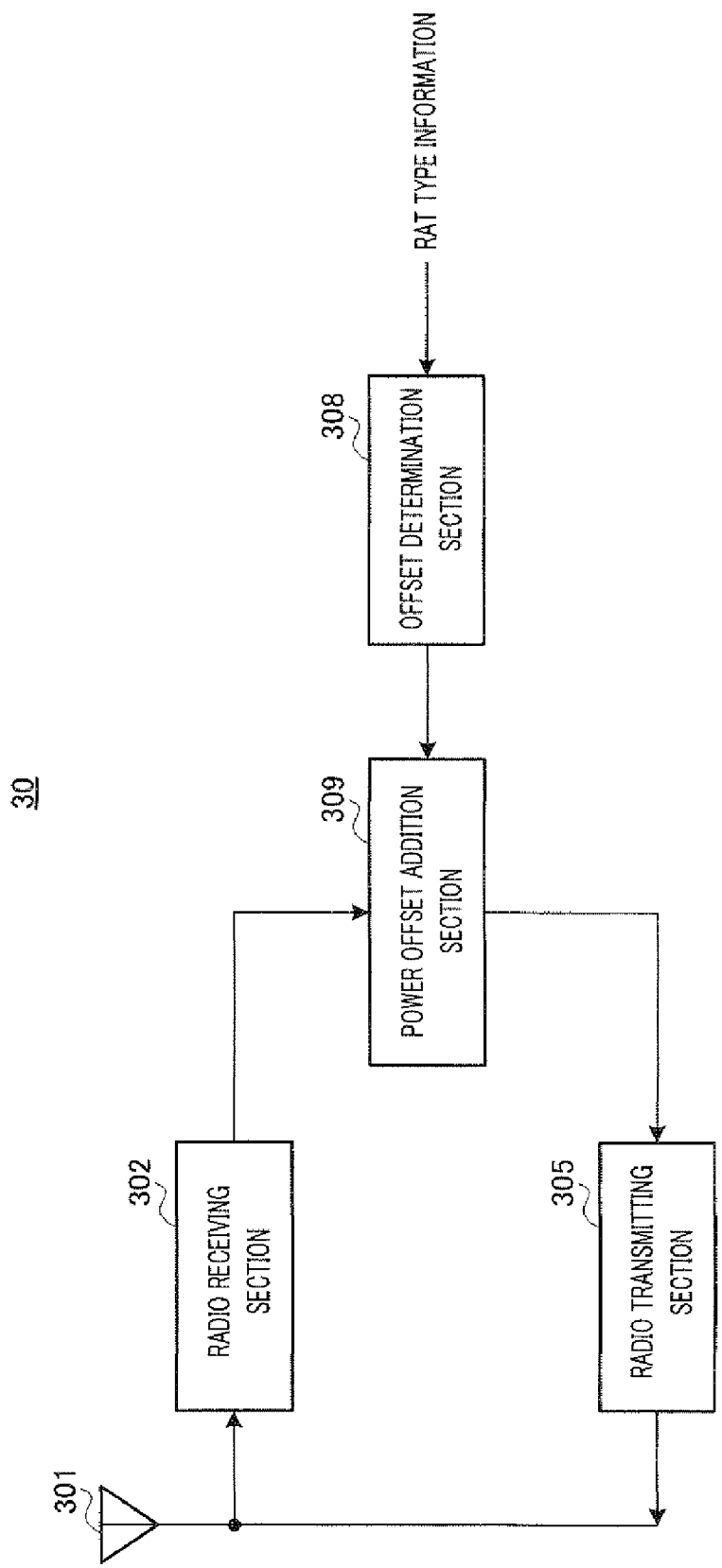
FIG. 15 is a block diagram showing the configuration of the relay station according to Embodiment 3 of the present invention.

Next, the configuration of LTE relay station 30 according to the present embodiment will be described. FIG. 15 shows the configuration of LTE relay station 30 according to the present embodiment. Further, in FIG. 15 the same reference numerals are assigned to the same parts in FIG. 5 (Embodiment 1), and description thereof will be omitted.

In LTE relay station 30 shown in FIG. 15, offset determination section 308, which has the table shown in FIG. 13 determines power offset ΔP with reference to the table shown in FIG. 13 according to RAT type information received as input. If the RAT type is WLAN, ΔP is determined to be −3 dB. Further, if the RAT type is WiMAX, ΔP is determined to be +5 dB. If LTE relay station 30 is connected to a host station of a narrowband communication system that covers an identical coverage area to LTE relay station 30 (e.g. WLAN host station 20 in FIG. 1) via a wired connection, LTE relay station 30 acquires RAT type information from the host station. ΔP determined in offset determination section 308 is inputted to power offset addition section 309.

Power offset addition section 309 adds ΔP determined in offset determination section 308 to part of the signal received as input from radio receiving section 302, and outputs the signal with the power offset to radio transmitting section 305.

Figure 16:
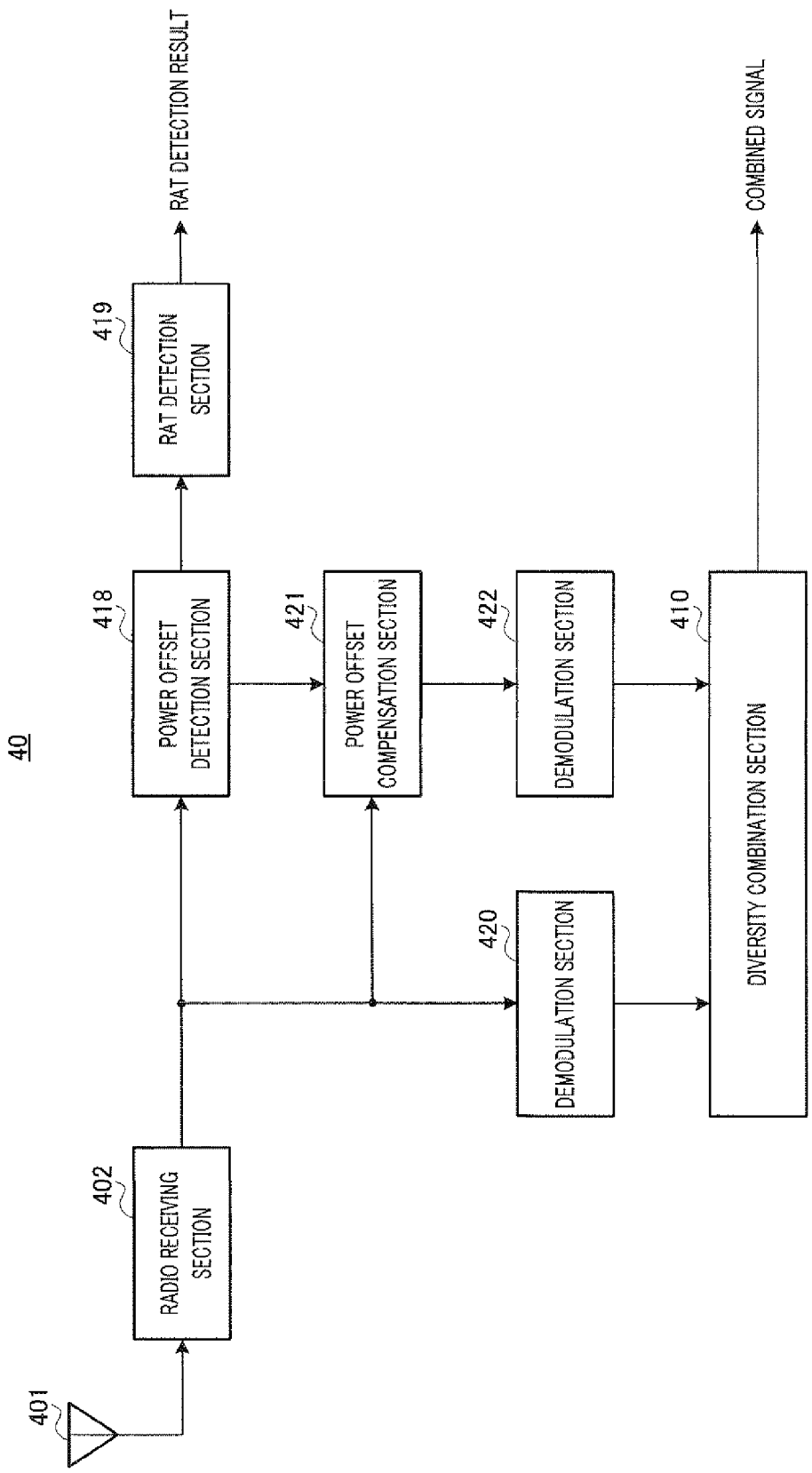
FIG. 16 is a block diagram showing a configuration of the mobile station according to Embodiment 3 of the present invention.

Next, the configuration of mobile station 40 according to the present embodiment will be described. FIG. 16 shows the configuration of mobile station 40 according to the present embodiment. Further, in FIG. 16 the same reference numerals are assigned to the same parts in FIG. 6 (Embodiment 1), and description thereof will be omitted.

In mobile station 40 shown in FIG. 16, radio receiving section 402 receives only a signal from LTE base station 10, or a signal from LTE base station 10 and a signal from LTE relay station 30 via antenna 401, and performs receiving processing including down-conversion and A/D conversion on each received signal, to output the resulting signal to power offset detection section 418, demodulation section 420 and power offset compensation section 421.

Demodulation section 420 demodulates the received signal and outputs the demodulated signal to diversity combination section 410.

Power offset detection section 418 detects power offset $\Delta P=|P_1-P_0|$ with the received signal. The detected ΔP is inputted to RAT detection section 419 and power offset compensation section 421.

Power offset compensation section 421 compensates for the power offset ΔP with the received signal and outputs the signal after power offset compensation, to demodulation section 422.

Demodulation section 422 demodulates the signal after power offset compensation and outputs the demodulated signal to diversity combination section 410.

Diversity combination section 410 diversity-combines the signal received as input from demodulation section 420 and the signal received as input from demodulation section 422 and outputs a combined signal.

RAT detection section 419, which has the table shown in FIG. 14, and detects in which RAT coverage area mobile station 40 is located as described above, with reference to the table shown in FIG. 14 according to the ΔP detected by power offset detection section 418. Then, RAT detection section 419 outputs a RAT detection result.

Embodiments 1 to 3 of the present invention have been explained.

In this way, according to Embodiments 1 to 3, the relay station of a wideband communication system including LTE covers an identical coverage area to a coverage area of a narrowband communication system including WLAN and WiMAX. Then, the relay station of a wideband communication system adds either a frequency offset, a time offset or a power offset as information showing that the mobile station, which receives a relay signal from the relay station, is located in the coverage area of a narrowband communication system, to a signal received from the base station of the wideband communication system, and relays the resulting signal. Therefore, according to Embodiments 1 to 3, in a mobile communication system where a plurality of RATs mix, it is possible make a control channel for reporting RAT information unnecessary and it is possible to prevent capacity of a control channel from becoming tight or insufficient.

Further, according to Embodiments 1 to 3, the mobile station can detect the coverage area of a narrowband communication system using a relay signal in a wideband communication system, and therefore, when the mobile station detects the coverage area of each RAT, the mobile station does not need to communicate using a control channel or narrowband communication system. That is, according to Embodiments 1 to 3, the mobile station can detect the coverage area of a narrowband communication system without switching to communication using a control channel or switching to communication using the narrowband communication system.

Therefore, according to Embodiments 1 to 3, the mobile station can reduce power consumed by a process of detecting the coverage area of a narrowband communication system. Further, the mobile station can shorten the time it takes to detect the coverage area of a narrowband communication system.

Further, according to Embodiments 1 to 3, in the mobile station, it is possible to diversity-combine a signal received directly from the base station of a wideband communication system and a relay signal from the relay station of the wideband communication system, so that it is possible to provide diversity effect. Therefore, according to Embodiments 1 to 3, it is possible to improve reception performance of the mobile station.

Embodiment 4

In the above Embodiments 1 to 3, LTE base station 10 reports to mobile station 40 using a broadcast channel in advance what information mobile station 40, which has detected the coverage area of a narrowband communication system, needs to report to LTE base station 10. Information requested to report to LTE base station 10 when mobile station 40 detects the coverage area of a narrowband system include mobile station ID, RAT detection result and a communication status of mobile station 40.

When mobile station 40 detects the coverage area of a narrowband communication system using a relay signal in a wideband communication system, mobile station 40 reports information requested in advance from. LTE base station 10, to LTE base station 10.

By this means, necessary information is sequentially reported to LTE base station 10 from mobile station 40 located in the coverage area of a narrowband communication system, so that it is possible to control traffic using not only coverage area information of a wideband communication system but also coverage area information of a narrowband communication system. For example, when mobile station 40 communicating in a wideband communication system with heavy traffic is located in the coverage area of a narrowband communication system with low traffic, LTE base station 10 performs handover of mobile station 40 to the narrowband communication system. Consequently, according to the present embodiment, LTE base station 10 can disperse traffic in the wideband communication system and the narrowband communication system, and optimally control the overall traffic in the coverage area of LTE base station 10. Further, in mobile station 40, it is not necessary to switch a carrier frequency or measure the power of a narrowband communication system until mobile station 40 receives a handover command to a narrowband communication system from LTE base station 10, so that it is possible to reduce the processing loads in mobile station 40.

Further, as described above, according to Embodiments 1 to 3, in mobile station 40, it is possible to reduce the time it takes to detect the coverage area of a narrowband communication system, so that, according to the present embodiment, mobile station 40 can report information quickly to LTE base station 10, and consequently, following the traffic control in LTE base station 10 improves.

Embodiments of the present invention have been explained.

The present invention may be implemented by combining the above embodiments.

Further, although cases have been explained above with the embodiments where one example of RATs of wideband communication systems is LTE and one example of RATs of narrowband communication systems is WLAN and WiMAX, the present invention does not limit the RAT of a wideband communication system to LTE. For example, other RATs of wideband communication systems include W-CDMA, LTE-Advanced or communication systems after LTE-Advanced. Further, the present invention does not limit RATs of narrowband communication systems to WLAN and WiMAX. For example, other RATs of narrowband communication systems include LTE, LTE-Advanced or communication systems after LTE-Advanced, which are used as hotspots.

Further, although cases have been explained with the above embodiments where part of the coverage area of a wideband communication system includes the entire coverage area of a narrowband communication system and the part of the coverage area of the wideband communication system overlaps the entire coverage area of the narrowband communication system, the present invention may be implemented as described above in cases where part of the coverage area of a wideband communication system includes part of the coverage area of a narrowband communication system and the part of the coverage area of the wideband communication system overlaps the part of the coverage area of the narrowband communication system.

Further, a base station apparatus may be referred to as a "Node B" and a mobile station apparatus may be referred to as a "UE." Furthermore, the relay station according to the embodiments is referred to as "repeater," "simple base station," "cluster head," and so on.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. These may be individual chips or partially or totally contained on a single chip.

"LSI" is adopted here but this may also be referred to as "IC," "system LSI," "super LSI," or "ultra LSI" depending on differing extents of integration. Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2007-188572, filed on Jul. 19, 2007, and Japanese Patent Application No. 2007-330837, filed on Dec. 21, 2007, including the specifications, drawings and abstracts, are incorporated herein by reference in their entirety.

INDUSTRIAL APPLICABILITY

The present invention is applicable to, for example, communication systems (for example, multihop systems) in which radio communication apparatuses including mobile stations and base stations carry out radio communication via relay stations.

The invention claimed is:

1. A relay station comprising:
a receiving section that receives a signal from a base station employing a first radio access technique and covering a first coverage area;
an addition section that adds one of a frequency offset, a time offset and a power offset to the signal; and
a transmitting section that transmits to a mobile station the signal with the offset, in a third coverage area that is identical to a second coverage area, part or entirety of which includes the first coverage area, and which is covered by a host station employing a second radio access technique different from the first radio access technique.

2. A mobile station comprising:
a receiving section that receives, in a first coverage area, a signal transmitted by a base station employing a first radio access technique and covering the first coverage area, and that receives a signal relayed by a relay station in a third coverage area that is identical to a second coverage area, part or entirety of which includes the first coverage area, and which is covered by a host station employing a second radio access technique different from the first radio access technique; and
a detection section that detects whether or not the mobile station is located in the second coverage area, based on which one of a frequency offset, a time offset and a power offset is added to the received signal.

3. A mobile communication system comprising:
a base station that employs a first radio access technique and covers a first coverage area;
a host station that covers a second coverage area, part or entirety of which includes the first coverage area, and that employs a second access technique different from the first radio access technique;
a relay station that covers a third coverage area identical to the second coverage area, and that adds one of a frequency offset, a time offset and a power offset to the signal received from the base station, and that transmits the signal with the offset to a mobile station located in the third coverage area; and
a mobile station that detects whether or not the mobile station is located in the second coverage area, based on whether or not the offset is added to the received signal.

4. A relay transmission method comprising the steps of:
adding one of a frequency offset, a time offset and a power offset to a signal received from a base station, employing a first radio access technique and covering a first coverage area; and
transmitting the signal with one offset to a mobile station in a third coverage area that is identical to a second coverage area, part or entirety of which includes the first coverage area, and which is covered by a host station employing a second radio access technique different from the first radio access technique.

* * * * *